US006661353B1

(12) United States Patent
Gopen

(10) Patent No.: US 6,661,353 B1
(45) Date of Patent: Dec. 9, 2003

(54) METHOD FOR DISPLAYING INTERACTIVE FLIGHT MAP INFORMATION

(75) Inventor: Nathan D. Gopen, Irvine, CA (US)

(73) Assignee: Matsushita Avionics Systems Corporation, Lake Forest, CA (US)

( * ) Notice: Subject to any disclaimer, the term of this patent is extended or adjusted under 35 U.S.C. 154(b) by 0 days.

(21) Appl. No.: 09/811,317

(22) Filed: Mar. 15, 2001

(51) Int. Cl.[7] .............................................. G01C 23/00
(52) U.S. Cl. ........................ 340/973; 340/990; 340/995; 340/996; 340/981; 340/963; 701/200; 701/16; 701/120
(58) Field of Search ................ 340/973, 990, 340/989, 995, 988, 996, 981, 963, 964, 946, 948; 701/200, 16, 120

(56) References Cited

U.S. PATENT DOCUMENTS

| 4,163,387 A | | 8/1979 | Schroeder |
| 4,647,980 A | | 3/1987 | Steventon et al. |
| 4,890,104 A | * | 12/1989 | Takanabe et al. ........... 340/995 |
| 4,975,696 A | * | 12/1990 | Salter, Jr. et al. ........... 340/973 |
| 5,057,835 A | | 10/1991 | Factor et al. |
| 5,208,590 A | * | 5/1993 | Pitts ............................ 340/973 |
| 5,289,272 A | | 2/1994 | Rabowsky et al. |
| 5,311,302 A | | 5/1994 | Berry et al. |
| 5,424,951 A | | 6/1995 | Nobe et al. |
| 5,524,272 A | | 6/1996 | Podowski et al. |
| 5,610,822 A | * | 3/1997 | Murphy ....................... 340/996 |
| 5,617,331 A | | 4/1997 | Wakai et al. |
| 5,678,171 A | | 10/1997 | Toyoma et al. |
| 5,760,819 A | | 6/1998 | Sklar et al. |
| 5,790,175 A | | 8/1998 | Sklar et al. |
| 5,801,751 A | | 9/1998 | Sklar et al. |
| 5,835,127 A | | 11/1998 | Booth et al. |
| 5,854,591 A | | 12/1998 | Atkinson |
| 5,929,895 A | | 7/1999 | Berry et al. |
| 5,953,429 A | | 9/1999 | Wakai et al. |
| 5,966,442 A | | 10/1999 | Sachdev |
| 5,973,722 A | | 10/1999 | Wakai et al. |
| 5,990,928 A | | 11/1999 | Sklar et al. |
| 6,014,381 A | | 1/2000 | Troxel et al. |
| 6,216,065 B1 | * | 4/2001 | Hall et al. ..................... 701/16 |
| 6,278,936 B1 | * | 8/2001 | Jones ........................... 340/989 |

* cited by examiner

Primary Examiner—Jeffery Hofsass
Assistant Examiner—Daniel Previl
(74) Attorney, Agent, or Firm—Orrick, Herrington & Sutcliffe LLP

(57) ABSTRACT

An interactive flight map is provided to a passenger, through which information on the areas overflown can be accessed and utilized. A map of the portion of the flight path near the airplane, where the map has one or more identifiers, is displayed to a passenger. Selection of an identifier from the passenger may be received, and in response information associated with the selected identifier is displayed to the passenger. The identifiers may be icons, text or other unique identifying symbols, associated with points of interest, map locations, tourist facilities, or other particular locations or facilities. The map may be scrolled to view other areas of the ground. In response to the selection of a particular identifier by a passenger, information may be displayed to the passenger in a variety of formats, such as HTML or video. A software program executing the method of displaying interactive flight map data is adapted to interface with other applications to transmit data to or receive data from such applications as appropriate.

18 Claims, 3 Drawing Sheets

METHOD FOR DISPLAYING INTERACTIVE FLIGHT MAP INFORMATION

BACKGROUND OF THE INVENTION

The field of this invention generally relates to aircraft in-flight entertainment systems, and more particularly to a method for interactively presenting location and destination information related to the flight path of the aircraft.

In-flight entertainment systems are often provided on aircraft in order to satisfy passenger demand for entertainment on long flights. Such in-flight entertainment systems can be divided into two categories: cabin-based systems, where one or more overhead screens display the same content to a section of the passenger cabin; and seat-based systems, where a separate screen is provided for and controlled by each passenger.

One form of content that has been displayed on both cabin-based and seat-based in-flight entertainment systems is flight path information. It is known to display a map showing the flight path of the airplane, identifying cities or points of interest on the map. In this way, passengers may be kept apprised of the location of the airplane and of the progress of the flight. Such a map may be broadcast by a central server in the airplane over a cabin-based or seat-based in-flight entertainment system, or both. That is, the map information is transmitted to each cabin section and/or each individual passenger screen. Such a system is disclosed in U.S. Pat. No. 4,975,696. While this system provides some information to the passengers, it does not offer any opportunity for the passenger to learn anything about the locations over which the airplane is flying, and does not offer the passenger the opportunity to interact with the map or with data on the map. The passenger is limited to viewing only the map data transmitted form the central server.

U.S. Pat. No. 5,208,590 discloses a similar system, in which the type of data displayed in association with the flight path map changes based on the particular phase of flight of the aircraft, as measured by onboard sensors. Range tables containing points of interest may be provided, such that an onboard system can determine whether the aircraft is sufficiently close to a point of interest. If so, one or more graphic screens can be broadcast to the passengers to inform them of the point of interest. While this system provides more information to the passengers than a simple map, it still lacks interactivity, and forces the passenger to view data regarding a particular point of interest, whether it is actually interesting to the particular passenger or not.

U.S. Pat. No. 5,610,822 discloses a similar system, in which a controller monitors a GPS receiver or other position-determining device, and triggers the offering of presentation information to a passenger about a point of interest when it determines that the aircraft is sufficiently close to that point of interest. This system allows the passenger to decline viewing information about a point of interest, or to select more than one presentation about that point of interest. However, the passenger still does not have the capability of selecting a particular point of interest; he or she is restricted to viewing presentations about a particular preselected point of interest at different phases of the flight. Further, the passenger cannot move the map to view points of interest in other areas; the preselected points of interest are limited to points near the flight path of the aircraft.

In addition, the flight path information display systems known in the art are combinations of hardware and software. The need for hardware adds to the weight that must be carried by the aircraft, and demands more space in already-cramped airplane cabins.

SUMMARY OF THE PREFERRED EMBODIMENTS

An interactive flight map is provided to a passenger, through which information on the areas overflown or other areas of the world of interest, can be accessed and utilized.

In an aspect of a preferred embodiment, a map of the portion of the flight path near the airplane, where the map has one or more identifiers, is displayed to a passenger. Selection of an identifier from the passenger may be received, and in response information associated with the selected identifier is displayed to the passenger. The identifiers may be icons, text or other unique identifying symbols, associated with points of interest, map locations, tourist facilities, or other particular locations or facilities.

In another aspect of a preferred embodiment, a map showing any portion of the flight path of the airplane, along with one or more identifiers, may be displayed to a passenger.

In another aspect of a preferred embodiment, in response to the selection of a particular identifier by a passenger, information may be displayed to the passenger in a variety of formats, such as HTML or video.

In another aspect of a preferred embodiment, a software program executing the method of displaying interactive flight map data is adapted to interface with other applications to transmit data to or receive data from such applications.

DETAILED DESCRIPTION OF THE PREFERRED EMBODIMENTS

Figure 1:
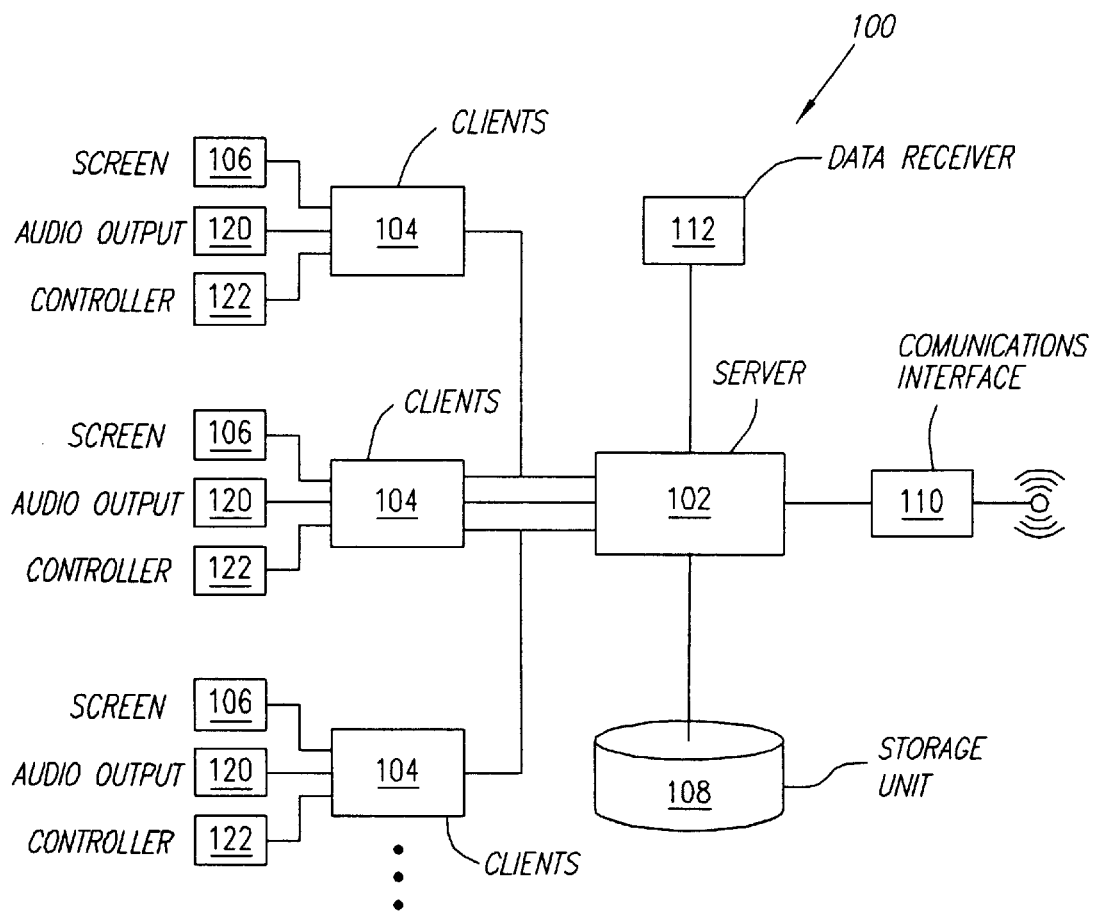
FIG. 1 is a schematic view of a preferred system for displaying interactive flight map information.

Referring to FIG. 1, an aircraft-borne system 100 is shown, on which software for displaying interactive flight path information is executed. By way of example and not limitation, the system 100 may be the System 3000 inflight entertainment system manufactured by Matsushita Avionics Systems Corporation of Lake Forest, Calif. A server 102 is connected to a number of clients 104, preferably via a standard client/server network architecture. The connection between the server 102 and the clients 104 is preferably performed via cables, such as copper wires, coaxial cables or fiber optic cables, but may be implemented via a wireless connection if desired. Each client 104 is preferably connected to a screen 106 such as a flat-panel LCD screen. The clients 104 are preferably located at individual passenger seats. The particular configuration of the client 104 and screen 106 hardware is not critical, and may be arranged based on the space available on the aircraft. For example, in one configuration a client 104 and a screen 106 are provided for each passenger in a particular area of the aircraft. In such a configuration, most of the clients 104 may be located under a passenger seat, where the screen 106 connected to that client 104 is installed in the back of that passenger seat for use by the passenger behind that seat. Other and further configurations are possible and may be utilized. Each client 104 is preferably connected to an audio output unit 120 as well as a screen 106. Each audio output unit 120 may be any type of device capable of sound reproduction, such as headphones or speakers. Each client 104 is also preferably connected to a controller 122, through which a passenger or other person can move a cursor on the screen 106 or otherwise interact with the data presented on the screen 106. The controller 122 is standard in the art, and may be a joystick, game controller, mouse, or other such device capable of moving a cursor on the screen 106.

The server 102 is preferably connected to a content storage unit 108, which is preferably located on board the aircraft as well. The content storage unit 108 may be a hard drive or other data storage structure associated with the server 102, and may be physically included within the server 102 if desired. Data within the content storage unit 108 may be arranged as a database, such as a relational database, for ease of access by the server 102.

In one embodiment, the system 100 is self-contained within the aircraft, meaning that neither the server 102 nor the clients 104 are connected with information handling systems or networks outside the aircraft. However, a communications interface unit 110 optionally may be connected to the server 102. The communications interface unit 110 provides a wireless connection between the server 102 and an outside network such as the Internet, via transmissions to and from ground stations and/or orbiting satellites. The initiation and conduct of such communications may be performed by standard processes.

A position data receiver 112 may also be connected to the server 102 as part of the system 100. The position data receiver 112 is adapted to receive signals, such as Global Positioning System (GPS) signals, from outside the aircraft that are useful for determining the position of the aircraft. The position data receiver 112 may itself convert those signals into the current position of the aircraft, or may pass the signals on to the server 102 or a separate information handling system for conversion into position data.

Figure 2:
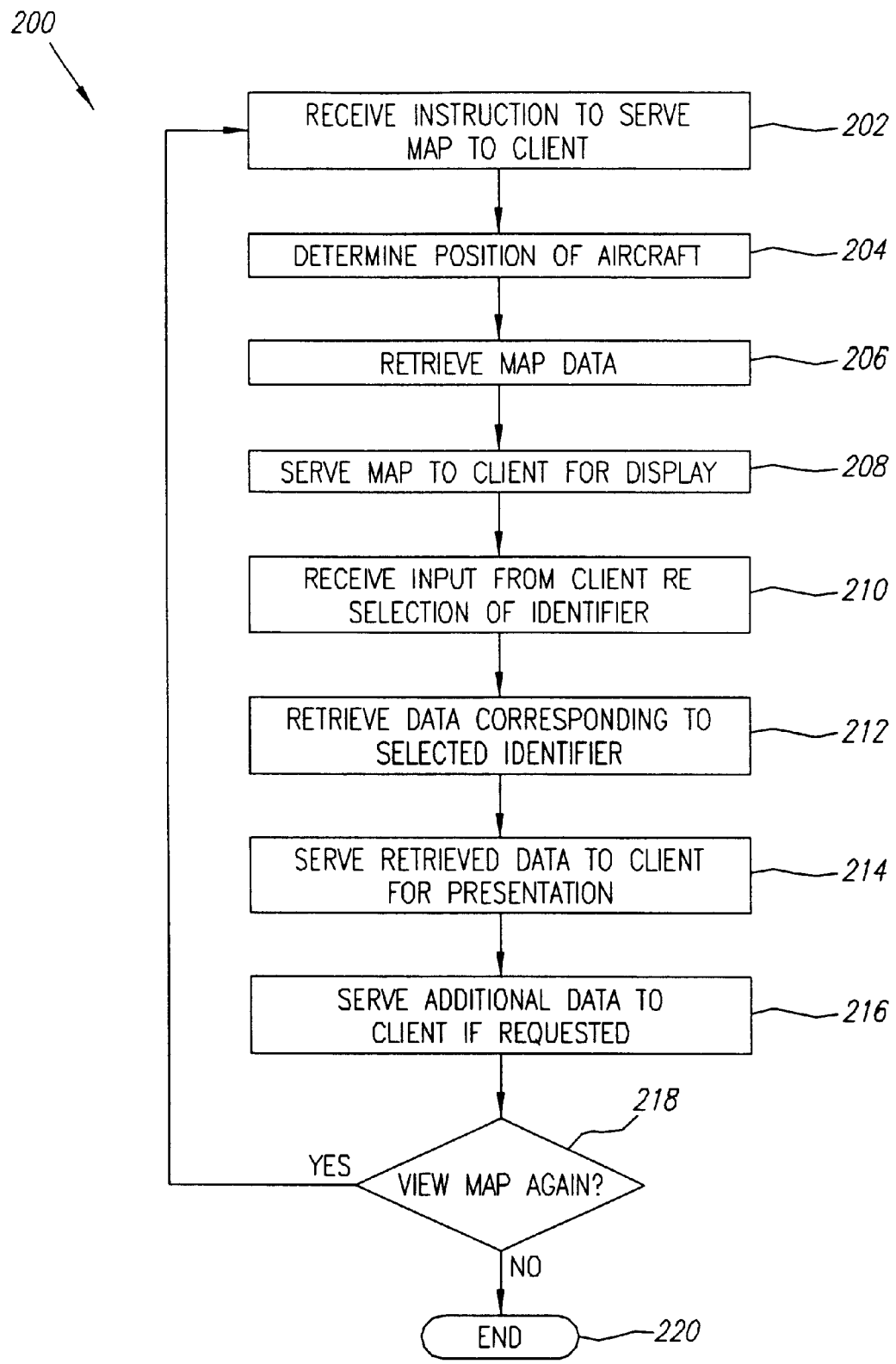
FIG. 2 is a flow chart showing a preferred method for displaying interactive flight map information.

Referring to FIG. 2, a method 200 for displaying interactive flight map information to one or more passengers in an aircraft is shown. The method 200 will be described with reference to the exemplary system 100 shown in FIG. 1, on which the method 200 preferably is implemented. The method 200 is preferably implemented through a computer program executed on or in association with the server 102. In step 202, the server 102 receives instructions to serve a map to a client 104. This request may take one or more different forms. For example, in one embodiment the instructions to serve a map to a client 104 provided for a passenger originate from that client 104. In another embodiment, the instructions to serve a map to a client 104 originate from a flight attendant or from the cockpit through the client 104 or other control device accessible to flight attendants or cockpit personnel. In another embodiment, the instructions to serve a map to one or more clients 104 originate within the server 102 or an associated information handling system, where such instructions are generated automatically at preset times or periods in an effort to engage the interest of a passenger. Other sources of instructions to the server 102 to serve a map 300 to a client 104 may be utilized, if desired.

Next, in step 204 the server 102 preferably determines the current position of the aircraft in which the system 100 is installed. Preferably, the position data receiver 112 receives signals such as GPS signals useful in determining the position of the aircraft, converts those signals into position data, and transmits that position data to the server 102. In another embodiment, the position data receiver 112 transmits raw signal data to the server 102 or an information handling system, which converts that raw signal data to position data. In another embodiment, the position data receiver 112 is not used, and other data is used to determine the current position of the aircraft, such as elapsed inflight time along the planned flight path.

Next, in step 206 the server 102 retrieves map data, preferably from the content storage unit 108. In one embodiment, the content storage unit 108 includes map data for the majority of Earth's surface, and the server 102 simply extracts the portion of the map data closest to the current position of the aircraft for serving a map 300 to the client 104. In another embodiment, the content storage unit 108 only includes map data for the portion of the planetary surface that is relatively close to the flight path of the aircraft, and the server 102 extracts the portion of the map data closest to the current position of the aircraft for serving a map 300 to the client 104. Such an embodiment saves data storage space when used on an aircraft assigned to a particular route. In another embodiment, the server 102 extracts map data from a source outside the aircraft via the communications interface unit 110. The server 102 also retrieves any identifiers 302 associated with the area covered by the map 300. The identifiers 302 are described in greater detail below. As with the map 300, the identifiers 302 are preferably retrieved from the content storage unit 108, but instead may be retrieved from a source outside the aircraft via the communications interface unit 110.

Figure 3:
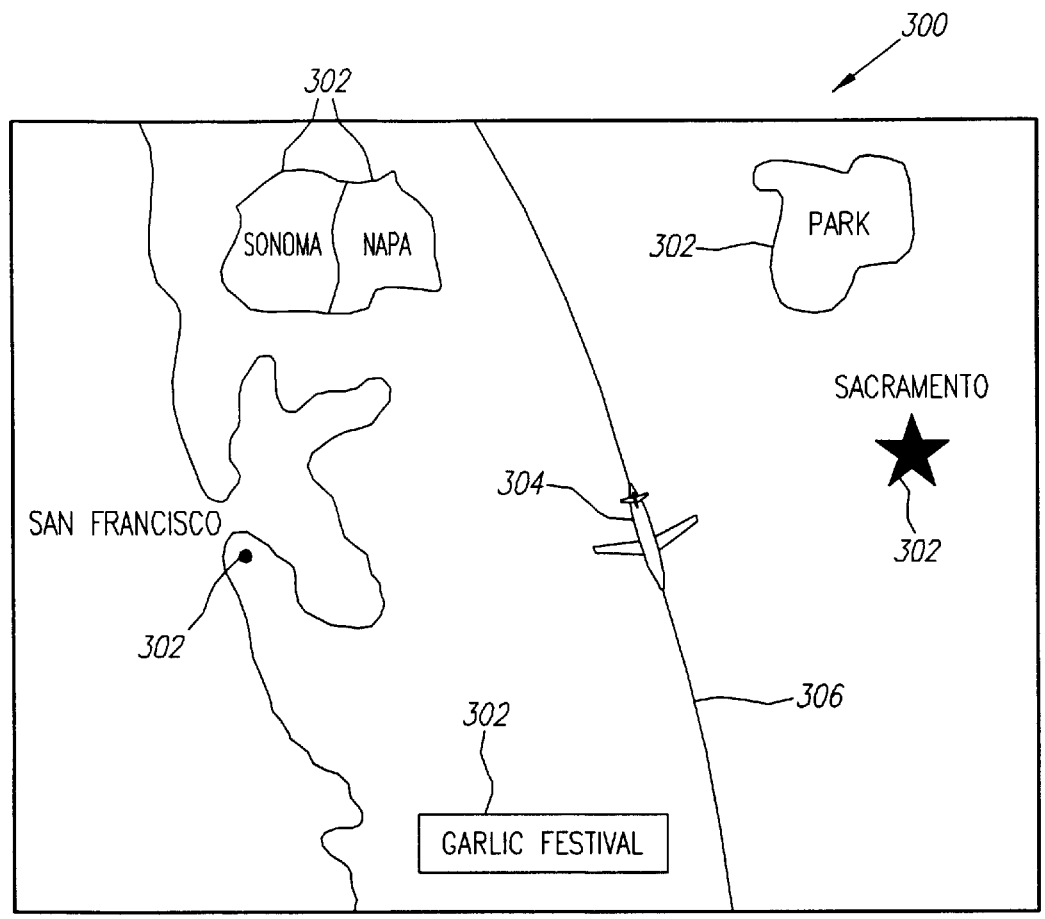
FIG. 3 is an exemplary map served to a client from a server.

Next, in step 208, the server 102 serves a map to the client 104 for display on the screen 106. Referring as well to FIG. 3, a map 300 served to the client 104 preferably displays a representation of the aircraft's current position 304, a representation of the flight path 306 of the aircraft, and one or more identifiers 302 associated with the area overflown by the aircraft. The map 300 shown is exemplary, and not limiting. The identifiers 302 are proximal to the flight path 306 of the aircraft, meaning that the identifiers 302 shown on the map are geographically proximal to the current position of the aircraft. The degree of proximity depends on the scale of the map 300, which is preferably preset to a particular size. The scale of the map 300 is not critical to the method 200. Each identifier 302 is associated with a feature of interest on the ground. Examples of such features include a city, monument, event at a particular location, museum, or park. The identifiers 302 may be presented as symbols, as words having a particular font size or font type, as areas which are highlighted as a cursor moves over them on the screen 106, or in any other way in which the presence of the identifiers 302 on the map 300 may be discerned by a user. It is possible that a map 300 served to a client 104 at a particular point on the flight path 306 on the aircraft will not include any identifiers 302, due to the absence of points of interest near the flight path. For example, if the aircraft is passing over an area such as an ocean, there may be no identifiers 302 displayed on the map 300, as there may be nothing on the surface near the aircraft of sufficient interest to associated with an identifier 302. Of course, identifiers 302 may be provided in association with the ocean itself, and may be connected, for example, with information about the ocean or marine life. The map 300 may include other textual or graphical information than the identifier 302, as desired. For example, the map 300 may combine elevation data or satellite photographs with political boundaries to better show the ground under the aircraft, and the names of certain features on the map 300, such as mountains or lakes.

Preferably, the client 104 includes an application program in software or firmware for receiving the data constituting the map 300 and displaying it on the screen 106. Such an application program is standard in the art, and may be a commercially-available program or one written specifically for the system 100 for use in implementing the method 200. In one embodiment, the application program used to display the map 300 on the screen 106 is a standard or modified browser program. Other or additional applications programs may be used if desired. Further, the same application program, or a different application program, may be used in step 202 to recognize a map request at the client 104 and transmit that request to the server 102. The server 102 preferably implements the system 200 as a computer program having an open interface. That is, the application program or programs run on each client 102 may take any form as long as they conform to the open interface provided by the computer program implementing the system 200. The use of an open interface is known to those skilled in the art, and is preferred in order to enhance the usefulness and interoperability of the software executed on the server 102. In this way, the server 102 may be used with a number of different commercially-available or custom-written software applications in the clients 104.

After the map 300 is served to a client 104 and displayed on a screen 106, a passenger viewing the display may select an identifier 302 on the map 300. Preferably, the client 104 is connected to a controller 122 used to move a cursor on the screen 106 onto an identifier 302. That identifier 302 can then be selected by, for example, pressing a button on the controller. Other methods of selecting an identifier 302 displayed on the screen 106 may be used, if desired. For example, the screen 106 may be a touch screen, capable of accepting the selection of an identifier 302 by a passenger's touch. The selection of an identifier 302 is transmitted from the client 104 connected to the screen 106 to the server 102, in a manner standard in the art. The data generated by the selection of an identifier 302 may be in any form recognizable to the server 102. For example, in one embodiment the input to the server 102 is an electronic signal associated with a particular uniquely-defined identifier 302. In another embodiment, the input to the server 102 is an electronic signal associated with a particular set of map coordinates, which is matched with the coordinates of an identifier 302 by the server 102. The selection of a point on a screen 106 by a user and transmission of that selection to an information handling device is standard, and may be performed in other ways if desired.

Preferably, the map 300 may be scrolled before an identifier 302 is selected. That is, the passenger can move the map in a particular direction to see an area not originally on the map 300, and one or more identifiers 302 in that area of the map 300 not originally shown. The scrolling function may be implemented in several ways. In one embodiment, when the passenger scrolls the map, such as by clicking on a icon representing a compass direction or by dragging a scroll bar on the edge of the map 300, that scrolling input is transmitted to the server 102, which then obtains a new map 300 from the content storage unit 108, where that new map 300 reflects the area to which the user has scrolled. The server 102 then serves that new map 300 back to the client 104. In another embodiment, the server 102 initially serves to the client 104 a map 300 that is larger than the screen 106. In this way, the passenger can scroll the map 300 to some extent without the need for additional map data to be served to the client 104.

Figure 4:
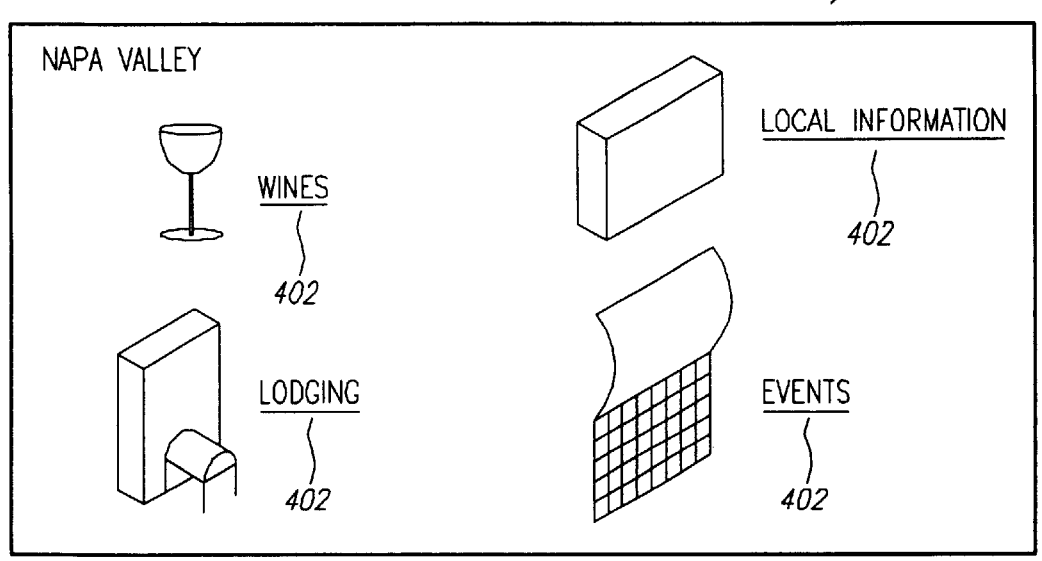
FIG. 4 is an exemplary data page served to a client from a server.

In step 210, the server 102 receives input from the client 104 related to the selection of an identifier 302 by the passenger. Next, in step 212, the server 102 retrieves data corresponding to the selected identifier 302, preferably from the content storage unit 108. The particular data retrieved from the content storage unit 108 depends on the particular identifier 302 selected. A particular identifier 302 may be associated with any type of multimedia data that can be stored in the content storage unit 108. For example, an identifier 302 associated with a city may be associated with a data page 400 as shown in FIG. 4, having information about lodging, tourist facilities, and the like for that city. As another example, an identifier 302 associated with a national park may be associated with a short video about that park, or with an audio description of the park in conjunction with a series of still photographs. As another example, an identifier 302 associated with an event at a particular location may be associated with a data page showing the date, time and admission fees for the event and the background of the event. As another example, an identifier 302 associated with a museum may be associated with a set of bitmapped images of the artworks within, without accompanying audio. As another example, an identifier 302 associated with a historical site may be associated with an audio file of a historian's description of the significance of the site. Many other and further linkages between an identifier 302 and content within the content storage unit 108 are possible, the examples above being only illustrative and not restrictive. In another embodiment, the server 102 retrieves data corresponding to the selected identifier 302 from a network or storage unit located outside the aircraft, utilizing the communications interface unit 110 to connect to that external source of data. Such a usage of the communications interface unit 110 may be advantageous where a high-speed broadband connection is available between the communications interface unit 110 and data storage equipment on the ground.

In step 214, the server 102 serves to the client 104 the data that was retrieved from the content storage unit 108 in step 212. This data preferably replaces the map 300 on the screen 106. The data served to the client 104 may be in the form of a data page 400 including markup language, a graphics file, an audio file, or other type of data. If the data page 400 includes a markup language, an application capable of interpreting and displaying that markup language is preferably included within or accessible by the client 104. Such an application may be the same as the application described above for use in displaying the map 300, or may be a separate application. Preferably, standard or modified browser software is used to display data that contains markup language. The markup language used may be HTML, XML, or another markup language. If the data served to the client 104 includes graphics data, an application capable of interpreting and displaying that graphics data is preferably included within or accessible by the client 104. Such an application may be integrated with an application used to view markup language and/or listen to audio data. Preferably, the application used is a standard or modified browser, or a plug-in or other program associated with that browser. The format of the graphics data is not critical, and may be in .bmp, .gif, .jpg, or another graphics format. If the data served to the client 104 includes audio data, an application capable of interpreting and displaying that audio data is preferably included within or accessible by the client 104. Such an application may be integrated with an application used to view markup language and/or view graphics data. Preferably, the application used is a standard or modified browser, or a plug-in or other program associated with that browser. The format of the audio data is not critical, and may be mp3 or any other audio format.

As an example of data served to the client 104 from the server 102, FIG. 4 shows a data page 400 containing markup language displayed on the screen 106. One or more links 402 may be defined by markup language or other means on the data page 400. The client 104 may include standard or modified browser software used to view the data page 400 or other forms of data served to the client 104.

If links or the like are provided on the data page 400 served to the client 104, then the passenger may select one of those links for further information or further data. If so, the selection of that link is transmitted to the server 102, which retrieves the associated data from the content storage unit 108 or from an external source via the communications interface unit 110 in the manner described above relative to step 212. In step 216, the server 102 then transmits that data to the client 104. The passenger may explore the links on the first data page 400 served to the client 104 or on subsequent data pages served to the client 104, repeating the process described here to do so.

The process then proceeds to step 218. If the passenger does not wish to view the map 300 again, the process terminates at step 220. If the passenger does wish to view the map again, the process returns to step 202 and begins anew.

An example of the method 200 will now be given. In this example, the system 100 provides a client 104 and screen 106 for each passenger on the aircraft. In this exemplary system, a passenger uses the controller 122 to move a cursor on the screen 106. The passenger wishes to view the progress of the aircraft, and requests a map 300 by moving the cursor to an appropriate location on the screen 106 and pressing a selection button on the controller 122. In step 202, that map request is converted to a signal and transmitted to the server 102. The server 102 receives the request for a map 300, and requests aircraft position data in step 204 by obtaining it from the position data receiver 112, which continuously outputs position data to the server 102. In step 206, the server 102 uses that aircraft position data received in step 204 to pull from the content storage unit 108 a map 300 corresponding to the ground area around the current position of the aircraft, as well as the identifiers 302 within the area encompassed by the map 300. That map 300 is then served back to the client 104 in step 208, and displayed to the passenger on the screen 106. In this exemplary embodiment, the map 300 is preferably displayed via browser software. The passenger may then view the map 300 and the identifiers 302 on the map 300. In this example, the aircraft is in the vicinity of San Francisco, and several identifiers 302 are provided on the map 300 relating to points of interest in the vicinity of the city. The passenger selects the identifier 302 associated with the Napa Valley by moving the cursor onto that identifier 302, then pressing a button on the controller 122. The client 104 then sends the passengers' selection of the Napa Valley identifier 302 to the server 102, where it is received in step 210. In step 212, the server 102 retrieves from the content storage unit 108 data associated with the Napa Valley identifier 302. In this example, that data is a data page 400 including markup language, as shown in FIG. 4. That data page 400 is served to the client 104 in step 214, where the browser application software in the client 104 receives that data page 400 and displays it on the screen 106. In step 216, the passenger clicks on the link 402 entitled "Local Information." That click is translated into a request for data and transmitted from the client 104 to the server 102, which then retrieves audiovisual data from the content storage unit 108 associated with the "Local Information" link 402. In this example, that audiovisual data is a video clip with sound, providing an overview of the Napa Valley area. That audiovisual data is then transmitted to the client 104, where the video component of that data is displayed on the screen 106 via the browser software, and the audio component of that data is played on the audio output unit 120, such as headphones worn by the passenger. After viewing the short clip on the Napa Valley, the passenger decides to view information about another area along the flight path 306 of the aircraft. In step 218, the passenger selects the map 300 again, by using the controller 122 to move the cursor to the appropriate location on the display, and selecting that location by pressing a button on the controller 122. The process then returns to step 202, whereby the map 300 is then provided once again to the passenger. Steps 204 and 206 proceed as described above. In step 208, after the map 300 is served to the client 104, the passenger decides to scroll eastward and obtain information about Lake Tahoe. The passenger scrolls the map 300 by clicking on an icon on the screen 106 associated with the eastward compass direction. That input is transmitted to the server 102, which retrieves a new map 300 from the content storage unit 108 and serves it to the client 104, where the new map 300 showing the Lake Tahoe area is displayed on the screen 106. The map 300 of the Lake Tahoe area includes identifiers associated with the points of interest and activities available in the area. The passenger may then select an identifier 302 in step 210, and the process continues as described above in this example.

In another example, the passenger wishes to view the progress of the aircraft, and requests a map 300 by using the controller 122 to move the cursor to an appropriate location on the screen 106 and pressing a selection button on the controller 122. In step 202, that map request is converted to a signal and transmitted to the server 102. The server 102 receives the request for a map 300, and requests aircraft position data in step 204 by obtaining it from the position data receiver 112, which continuously outputs position data to the server 102. In step 206, the server 102 uses that aircraft position data received in step 204 to pull from the content storage unit 108 a map 300 corresponding to the ground area around the current position of the aircraft, as well as the identifiers 302 within the area encompassed by the map 300. That map 300 is then served back to the client 104 in step 208, and displayed to the passenger on the screen 106. In this exemplary embodiment, the map 300 is preferably displayed via browser software. The passenger may then view the map 300 and the identifiers 302 on the map 300. In this example, the aircraft is in the vicinity of Memphis, and an identifier 302 is placed adjacent to the representation of the city, bearing a graphic representation of a musical note. The passenger selects that identifier 302 by moving the cursor onto it, then pressing a button on the controller 122. The client 104 then sends the passengers' selection of an identifier 302 to the server 102, where it is received in step 210. In step 212, the server 102 retrieves from the content storage unit 108 data associated with the musical identifier 302. In this example, that data is audio data including clips of several blues songs and discussions of the history of blues music in Memphis. That audio is served to the client 104 in step 214, where application software in the client 104 receives that audio data and is played on the audio output unit 120, such as headphones worn by the passenger. After listening to the audio clip, the passenger does not request any additional data in step 216, and allows the process to end in step 220 after step 218 rather than view the map again.

While the method above has been described in terms of the interaction between the server 102 and a particular client 104 for the sake of clarity, the server 102 preferably is connected to a number of individual clients 104, and receives data from and serves data to each of the individual clients 104 using multitasking or multithreading techniques that are standard in the art. Further, it is possible that one or more of the individual clients 104 will be associated with a cabin screen 106 or group of individual screens 106, and controlled by a flight attendant or another person other than a passenger. In this way, a flight attendant may select information of interest to passengers traveling in one class of the airplane, and cause that information to be projected on a large cabin screen 106 or to be projected on a number of individual screens 106. In this way, each individual seat need not be provided with a client 104 and/or control systems for allowing the passengers to select an identifier 302 on a map 300 on the screen 106, thereby saving cost and weight in sections of the airplane reserved for lower-fare classes.

A preferred method for displaying interactive flight map information and many of its attendant advantages has thus been disclosed. It will be apparent, however, that various changes may be made in the content and arrangement of the steps of the method without departing from the spirit and scope of the invention, the methods hereinbefore described being merely preferred or exemplary embodiments thereof. Therefore, the invention is not to be restricted or limited except in accordance with the following claims and their legal equivalents.

What is claimed is:

1. A method for displaying interactive flight map information to one or more passengers on an aircraft over an in-flight entertainment system, said in-flight entertainment system including a server and a client, comprising:
    displaying a map showing the flight path of the aircraft and a plurality of selectable point of interest identifiers associated with features proximal to the flight path during a flight;
    receiving a request to scroll the map in a direction;
    scrolling the map in the direction;
    displaying the scrolled map, the scrolled map comprising a plurality of selectable point of interest identifiers associated with additional points of interest;
    receiving a selection of a selectable point of interest identifier, said selection being made by a passenger wherein the passenger can select the selectable point of interest identifier throughout the flight;
    retrieving data associated with said received selected point of interest identifier; and
    displaying said retrieved data.

2. The method of claim 1, further comprising receiving a request to display a map.

3. The method of claim 1, wherein said retrieving is performed from a content storage unit located on the aircraft.

4. The method of claim 1, wherein said point of interest identifiers are associated with points of interest on the ground.

5. The method of claim 1, wherein said point of interest identifiers are associated with events at a particular location on the ground.

6. The method of claim 1, wherein said data transmitted to the client comprises markup language.

7. The method of claim 6, wherein said data transmitted to the client includes markup language defining at least two links, further comprising the steps of:
    receiving a selection of a particular link;
    retrieving data associated with said link; and
    displaying said retrieved data.

8. The method of claim 1, wherein said data transmitted to the client comprises graphics data.

9. The method of claim 1, wherein said data transmitted to the client comprises video data.

10. The method of claim 1, wherein said data transmitted to the client is audio data.

11. The method of claim 1, wherein receiving comprises moving a cursor over the particular point of interest identifier.

12. A method for transferring interactive flight map data between a server and a client-based application adapted to present data to and collect input from a user, the server and client forming an in-flight entertainment system on an aircraft, comprising:
    transmitting to the client-based application map data comprising the flight path of the aircraft and a plurality of selectable point of interest identifiers associated with features proximal to the flight path during a flight;
    receiving from the client-based application a request to scroll the map in a direction;
    transmitting to the client-based application scrolled map data comprising a plurality of selectable point of interest identifiers associated with additional points of interest;
    receiving from the client-based application a selection of a selectable point of interest identifier wherein the selection of the selectable point of interest identifier can be made throughout the flight;
    retrieving data associated with said received selected point of interest identifier; and
    transmitting to the client-based application said retrieved data.

13. A computer program product, comprising:
    instructions for displaying a map showing the flight path of the aircraft and a plurality of selectable point of interest identifiers associated with features proximal to the flight path during a flight;
    instructions for receiving a request to scroll the map in a direction;
    instructions for scrolling the map in a the direction;
    instructions for displaying the scrolled map, the scrolled map comprising a plurality of selectable point of interest identifiers associated with additional points of interest;
    instructions for receiving a selection of a selectable point of interest identifier wherein the selection of the selectable point of interest identifier can be made throughout the flight;
    instructions for retrieving data associated with said received selected point of interest identifier; and
    instructions for displaying said retrieved data.

14. The product of claim 13, further comprising instructions for receiving a request to display a map.

15. The product of claim 13, wherein said instructions for retrieving further comprise instructions for retrieving data associated with said received selected identifier from a content storage unit located on the aircraft.

16. The product of claim 13, further comprising:
    instructions for placing a link in said retrieved data;
    instructions for receiving a selection of a particular link;
    instructions for retrieving data associated with said link; and 17. A method for displaying interactive flight map information to one or more passengers on an aircraft over an in-flight entertainment system, comprising:

displaying a first map and a plurality of selectable point of interest identifiers associated with points of interest proximal to the flight path during a flight;

receiving a request from the passenger for a second map;

displaying the second map, the second map comprising a plurality of selectable point of interest identifiers associated with additional points of interest;

receiving a selection of a selectable point of interest identifier, wherein said selection comprises receiving an instruction from a passenger and wherein the particular selectable point of interest identifier can be selected by the passenger throughout the flight;

retrieving data associated with said received identifier; and displaying said retrieved data.

18. The method of claim 17, wherein said selection comprises moving a cursor over the particular point of interest identifier.

* * * * *